INVENTOR
L. M. SMITH
BY
R. O. Nimtz
ATTORNEY

INVENTOR
L. M. SMITH
BY R. O. Nimtz
ATTORNEY

United States Patent Office 3,071,700
Patented Jan. 1, 1963

3,071,700
SEQUENTIAL PULSE TRANSFER CIRCUIT
Larrabee M. Smith, Morris Plains, N.J., assignor to Bell Telephone Laboratories, Incorporated, New York, N.Y., a corporation of New York
Filed Apr. 24, 1959, Ser. No. 808,744
10 Claims. (Cl. 307—88.5)

This invention relates to binary data processing apparatus and, more particularly, to inductively coupled bistable stages for use in such apparatus.

Bistable circuits have become increasingly useful in data processing systems as convenient storage mechanisms for information represented in a binary, i.e., two-state, code. To meet the present-day requirements for speed, electronic components such as vacuum tubes, gas triodes and transistors have been used to construct these bistable circuits. Transistors are particularly desirable in such applications because of their low current requirements, small physical size and low operating voltages.

In order to obtain any practical use of bistable circuits, however, means must be provided to transfer binary information in the form of electrical signal conditions to and from the bistable circuits. Coupling circuits for these information transfers are most advantageously designed with as few components as possible, a low transfer time, and greatest possible reliability. In coupling circuits heretofore proposed, these requirements have been difficult, if not impossible, to reconcile.

It is an object of the present invention to improve the speed, stability and reliability of binary data processing apparatus.

It is a more specific object of the invention to inductively couple bistable circuits in binary data processing apparatus so as to improve the transfer characteristics of such circuits.

It is another object of the invention to transfer binary states between single transistor bistable stages with a minimum of components and with the greatest possible reliability.

In accordance with the present invention, a plurality of bistable circuits are coupled together through gated inductive elements. In such a configuration, the inductive elements serve a dual purpose. First, the inductive element, in the form of a transformer, for example, serves to isolate each bistable circuit from the other bistable circuits during quiescent periods. Secondly, the inductance of this coupling element serves as a short-term memory element for a portion of the transfer period. More particularly, the output of a bistable device is connected to the primary winding of a current transformer. The secondary winding of the transformer is connected to the input to the next succeeding bistable circuit. The primary winding is returned to a bias of such a voltage that current flows in the primary winding only if the preceding bistable circuit is in the ON state. In order to transfer the state of the first bistable circuit to the second, a switch in this primary winding circuit is opened. If the first circuit is in the ON state, the rapid decay of the primary current induces a high current in the secondary which is applied to the second bistable circuit to turn it ON. In this way, the ON state is transferred from the first circuit to the second. If the first circuit were in the OFF state, there would be substantially no primary current to interrupt and hence the second circuit would not be turned ON but would remain OFF.

It can be seen that inductive coupling circuits of this type are useful in many transfer circuits handling binary information. The extreme simplicity of the coupling circuits permits more economical apparatus with greater reliability and higher speed of operation.

These and other objects and features, the nature of the present invention and its various advantages, will be more readily understood upon consideration of the attached drawings and of the following detailed description of the drawings.

Figure 1:
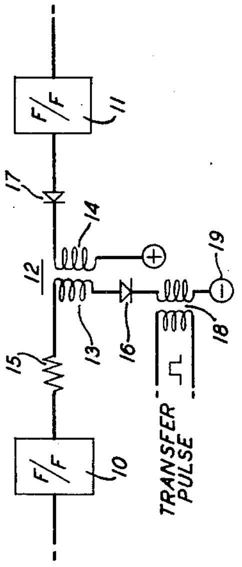
FIG. 1 is a schematic diagram of an inductively-coupled bistable circuit chain in accordance with the present invention.

Referring more particularly to FIG. 1 there is shown a gated inductive transfer circuit for transferring the state of a first bistable device 10, to a second bistable device 11. The transfer circuit of FIG. 1 comprises, essentially, a transformer 12 having a primary winding 13 and a secondary winding 14. The primary winding 13 is connected in series with a resistor 15, a diode 16, one winding of a pulse transformer 18 and the output of bistable device 10. The secondary winding 14 is connected in series with a diode 17 and the input of bistable device 11. The operation of the circuit of FIG. 1 is as follows.

Assuming that bistable device 10 is in the ON state and that the potential applied from a source 19 is more negative than the ON-state potential of bistable device 10, a current will flow in the primary winding 13 of the transformer 12. If a positive transfer pulse is applied to transformer 18, diode 16 will be reverse-biased and terminate the current flow in primary winding 13. The rapid decay of current in the primary winding 13 will induce a high current flow in the secondary winding 14. This current flow is of such a direction as to forward bias diode 17 and turn on bistable device 11.

It will be noted that the amplitude of the transfer pulse must be sufficient to reverse bias biode 16. That is, the amplitude of this pulse must exceed the ON-state potential of bistable device 10 by at least the reflected effect of the output current in the load represented by bistable device 11. Furthermore, the voltage of source 19 must be more positive than the OFF-state potential of bistable device 10 to prevent triggering of device 11 when device 10 is OFF. An optimum transfer takes place when resistor 15 is of approximately the same magnitude as the load represented by bistable device 11. The diode 17 serves to block the transient occurring when bistable device 10 initially goes from the OFF to the ON state.

It can be seen that the transfer circuit of FIG. 1 is essentially a current gate. Energization of its output occurs only when a current is flowing in the primary winding 13 of transformer 12 and, furthermore, only when this current is interrupted by the presence of a transfer pulse. Thus, there are required the two simultaneous conditions for its enablement, an input current and a transfer current. To some extent this circuit is therefore the dual of a conventional voltage gate.

The circuit of FIG. 1 is only one configuration for which the principle of a current gate may be utilized. Other configurations, involving the same principle, will be discussed with respect to FIGS. 2 and 3.

Figure 2:
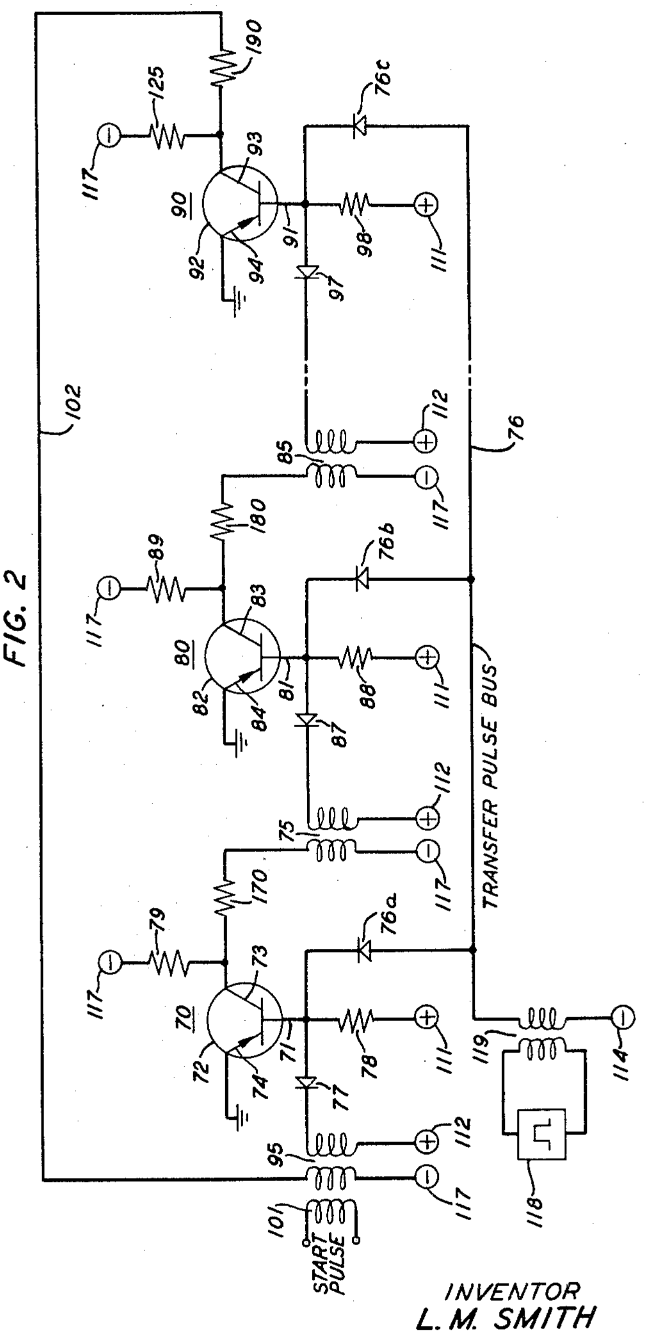
FIG. 2 is a schematic diagram of a ring counter in accordance with the invention.

Referring more particularly to FIG. 2, there is shown the circuit diagram of a ring counter circuit using single transistor bistable stages and employing current gates embodying the principles illustrated in the configuration of FIG. 1. The ring counter circuit of FIG. 2 comprises a plurality of bistable stages, three of which are illustrated, stages 70, 80 and 90. Each of these stages comprises a single transistor bistable circuit of the general form disclosed in M. E. Mohr Patent 2,594,336, issued April 29, 1952. Each stage is, in general, similar to stage 70 and hence only this stage will be described in detail.

Stage 70 comprises a point contact transistor 72 having a base electrode 71, a collector electrode 73 and an emitter electrode 74. A resistor 78 is connected to base electrode 71 and has a resistance high compared to the emitter connection which is made directly to ground potential. Under these conditions, the transistor 72 is characterized by a negative resistance region in its emitter voltage-current characteristic. Due to this negative resistance region, the transistor is capable of remaining in either one of two stable states: first, where the transistor is essentially cut off and has a low collector current, and, second, where the transistor is saturated and has a very high collector current. The transistor 72 may be turned from the OFF state to the ON state by drawing a sufficient amount of current through the base electrode to bias the transistor to the negative resistance portion of its voltage-current characteristic. Conversely, the transistor 72 can be turned from the ON state to the OFF state by biasing the transistor electrodes out of the negative resistance region. This may be accomplished, for example, by biasing the base electrode out of the negative resistance region.

Base resistor 78 is returned to a base voltage supply 111. A load resistor 79 connects the collector electrode 73 to a negative collector supply voltage source 117. Also connected to collector electrode 73 is an output circuit comprising a resistor 170 and output transformer 75 returned to source 117. The base electrode 71 is connected to an input circuit comprising diode 77 and transformer 95 returned to a positive voltage supply 112. The base electrode 71 is also coupled to a transfer pulse bus 76 through diode 76*a*. Bus 76 is returned through a transformer 119 to a negative voltage source 114. Pulse source 118 is connected to transformer 119 so as to apply positive transfer pulses to bus 76.

The output circuit of each of the stages of the ring counter of FIG. 2 is coupled to the input circuit of the succeeding stage through one of the transformers 75, 85 or 95. That is, stage 70 is coupled to stage 80 through transformer 75, stage 80 is coupled to stage 90 and any intervening stages through transformer 85, and stage 90 is coupled through transformer 95 back to stage 70 to complete the closure of the ring. A second input winding 101 is provided for transformer 95 to permit the initiation of a cycle. The circuit operates as follows.

Assuming initially that all of the stages of the ring counter of FIG. 2 are in the OFF state, stage 70 may be turned ON, for example, by interrupting a curent flow in winding 101 of transformer 95. This may be accomplished by the application of a "start pulse" to this winding. This start pulse is followed by a series of pulses from source 118 applied to transfer bus 76. These pulses are applied in parallel to the base electrodes of all of the stages through diodes 76*a*, 76*b*, . . . 76*c*. Voltage source 114 is of such a level as to reverse-bias these diodes in the absence of a transfer pulse. When a transfer pulse occurs, however, each of these diodes 76*a* through 76*c* becomes forward biased and conducts a pulse of current to base electrodes 71, 81, . . . 91. This pulse of current is of a proper polarity and magnitude to turn each of the transistors 72, 82, . . . 92 OFF if any one of them was previously in the ON state. If these transistors were already in the OFF state, the transfer pulse will have substantially no effect.

Assuming, then, that only stage 70 is in the ON state, the transfer pulse applied to bus 76 turns transistor 72 OFF. The high output current flowing from collector 73 through resistor 170 and the primary winding of transformer 75 when transistor 72 is in the ON state is therefore abruptly terminated. This abrupt termination of current flow in the primary winding of transformer 75 induces a high current flow in the secondary winding in such a direction as to forward-bias diode 87. While the transfer pulse on bus 76 continues to persist, however, transistor 82 remains OFF, a return current path being provided through diode 76*b*. Before the current in the secondary winding of transformer 75 decays, the transfer pulse is terminated and diode 76*b* again becomes back-biased. The inductance of transformer 75, however, forces the secondary current to continue to flow through diode 87. Since diode 76*b* is now reverse-biased, the current must be sustained through the base electrode 81 of transistor 82. This base current forces transistor 82 into the negative resistance region and transistor 82 is turned ON.

It can be seen that the ultimate effect of the transfer pulse on bus 76 is to transfer the ON state from stage 70 to stage 80. The next transfer pulse will similarly transfer the ON state from stage 80 to the next succeeding stage, and so forth. Ultimately the ON state reaches stage 90. On the next transfer pulse, the ON state is transferred from stage 90 through feedback lead 102 to the first stage 70. This ON state will continue to circulate through the ring of bistable stages as long as transfer pulses are applied.

In order to return all stages of the ring counter of FIG. 2 to the OFF state, i.e., to disable the counter, it is merely necessary to apply a pulse from source 118 of a sufficient duration to allow the secondary currents in all of the coupling transformers to decay to a value where they can no longer turn ON the succeeding stage.

In accordance with the present invention, the various stages of the ring counter of FIG. 2 are coupled together by what may be termed a gated inductive transfer circuit. The coupling transformers 75, 85, . . . 95, together with the associated diodes and pulsing circuitry, form current gates between these stages. Each of these gates is operated only if a current transfer pulse is simultaneously present with a current output from the preceding stage. To achieve this gating operation, the coupling transformers perform several functions.

First, when the ring counter is in a quiescent state and no transfers are taking place, the coupling transformers serve to isolate the input of each stage from the output of the preceding stage. This isolation is necessary to preserve the stability of the counter in any of its discrete counting conditions.

Second, the coupling transformers provide the necessary coupling between stages in the presence of a transfer pulse. It will be noted that the only effective current transfer takes place when the transfer pulse first appears and the preceding stage is turned OFF. Although a current will also be transferred when the preceding stage is turn ON, the diodes 77, 87 and 97 effectively block this current since it would tend to flow in the direction of high resistance.

Thirdly, the coupling transformers provide a degree of memory in that the inherent inductance of these transformers cause a current to continue to flow until after the transfer pulse is removed. A similar memory function occurs in conventional voltage gates where a charge is stored on a capacitor. Since transistors are essentially current responsive devices, however, the current gating and storage are better suited to turn them ON.

In a voltage gate, for example, in which a capacitor is used for storage, it is normally necessary to protect the succeeding stage from the turn-ON transient by means of a large series impedance. This impedance lengthens the charging time of the capacitor and hence restricts the circuit to lower operating frequencies. In the circuit of FIG. 2, however, the turn-ON transient is blocked by a simple series diode. The impedance in series with the primary winding consists merely of the small series resistor, the emitter-collector resistance of the transistor and the impedance of the transformer. All of these are or can be made very low. This circuit is therefore inherently capable of faster operation than the conventional voltage gate circuit. It will be noted that there are no capacitors in the ring counter of FIG. 2.

The single transistor bistable stages have been illustrated in FIG. 2 only for the purposes of convenience Any other transistor bistable circuit would serve equally well with the obvious circuit modifications. Other obvious modifications will be readily apparent to those skilled in the art.

The ring counter circuit of FIG. 2 is well suited for transferring a single ON state among the various stages. If it is desired to transfer successive ON states, however, difficulties may arise due to differences in switching times between the transistors. If one stage is turned ON before the succeeding stage goes to the ON state, the stored current may be transferred back to the primary winding of the coupling transformer and thus deprive the next stage of its triggering pulse. A shift register will be described with reference to FIG. 3 which overcomes this difficulty by modifying the transfer circuit to obtain positive control of the switching operation.

Figure 3:
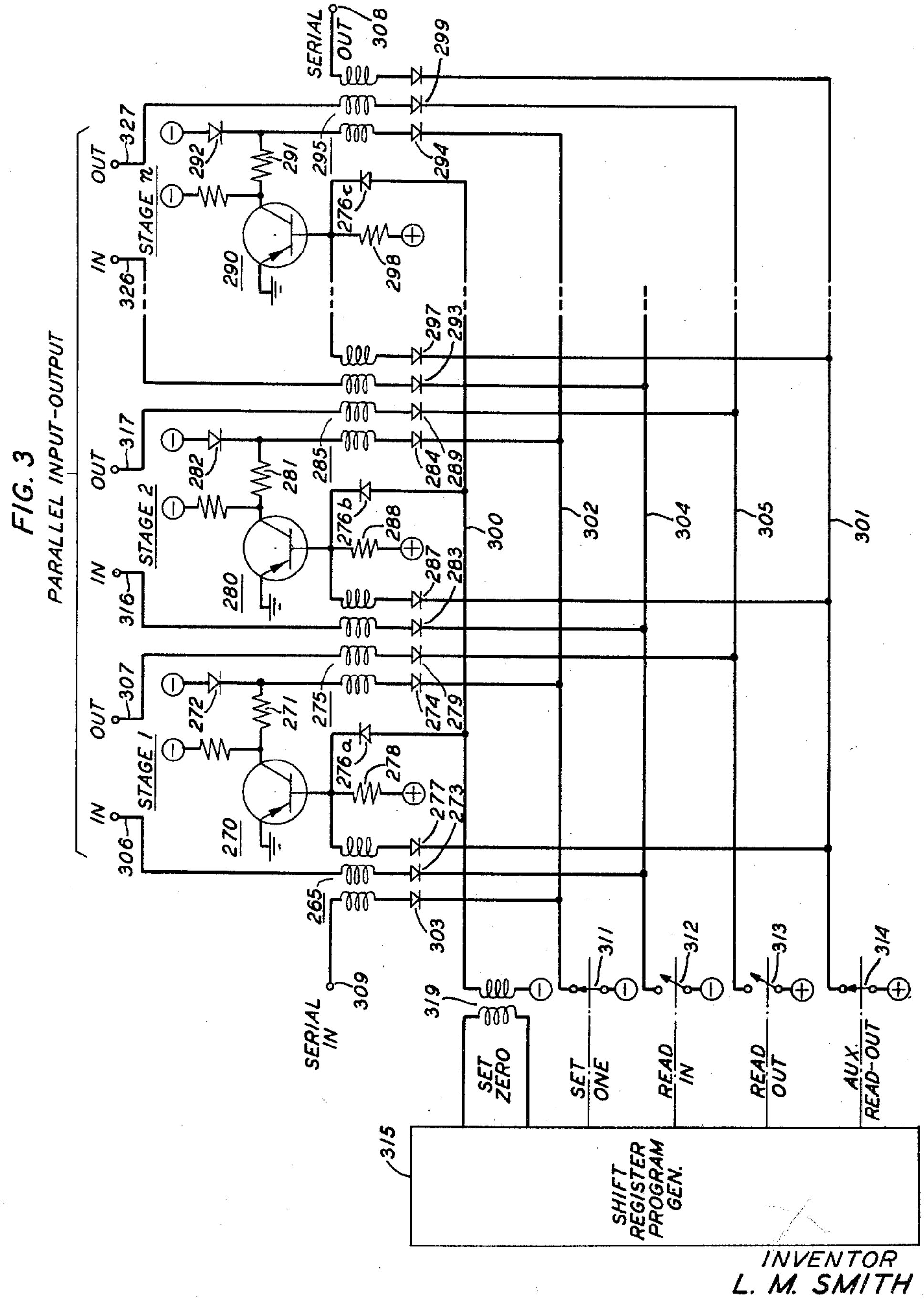
FIG. 3 is a schematic diagram of a shift register in accordance with the invention and showing read-in, read-out and resetting connections.

Referring then to FIG. 3, there is shown a transistor shift register and control circuits providing positive control of the transfer between stages as well as read-in read-out and clearing operations. The shift register of FIG. 3 comprises a plurality of single transistor binary stages similar to the stages of the ring counter of FIG. 2. Since all these stages are similar, only stage 1 will be described in detail.

Stage 1 comprises a point-contact transistor 270, the emitter of which is connected to ground and the collector of which is returned through a load resistor to a negative voltage supply. The base of transistor 270 is returned through a base resistor 278 to a positive voltage supply. The base of transistor 270 is connected through diode **276*a* to set-zero bus 300 and through the secondary winding of transformer 265 and diode 277 to auxiliary read-out bus 301**.

An output circuit comprising a load resistor 271 and the primary winding of transformer 275 is connected to the collector of transistor 270. This output circuit is returned through diode 274 to set-one bus 302. The midpoint of resistor 271 and the primary winding of transformer 275 is returned through diode 272 to a negative voltage supply.

The primary winding of transformer 265 is connected through diode 303 to set-one bus 302. A second input winding on transformer 265 is connected in series with diode 273 between a parallel read-in terminal 306 and read-in bus 304. Similarly, a second output winding on transformer 275 is connected in series with diode 279 between a parallel read-out terminal 307 and read-out bus 305.

As in FIG. 2, the output of each stage of the shift register of FIG. 3 is coupled to the input of the next stage. Unlike the ring counter, however, the output of the last stage is not coupled back to the input, but is coupled to a serial output terminal 308. The input to the first stage is derived from a serial input terminal 309.

In contrast to the ring counter of FIG. 2, the circuit of FIG. 3 obtains positive control over the transfer function and hence is capable of transferring adjacent ON states between stages. In order to accomplish such transfers, i.e., advance the binary representations stored in the shift register, the following sequence takes place.

A positive set-zero pulse is derived from transformer 319. The secondary winding of transformer 319 is returned to a negative supply voltage of a value to reverse-bias diodes **276*a*, 276*b*, . . . 276*c* in the absence of a set-zero pulse. When a set-zero pulse does occur, each of these diodes 276*a* through 276*c* becomes forward-biased and conducts a pulse of current to the base electrodes of transistors 270 through 290**. This pulse of current is of a proper polarity and magnitude to turn each of these transistors OFF if they were previously in the ON state. The transistors already in the OFF state are not affected.

While in the ON state, each transistor produces a large current flow in the primary winding of the associated coupling transformer. When cut OFF by a set-zero pulse, this current would normally be abruptly terminated. However, diode 272 provides an alternate path for this sustained primary current flow and it continues to flow in the primary winding of transformer 275. If the set-zero pulse on bus 300 is immediately followed by a set-one pulse on bus 302, i.e., if normally closed switch 311 is opened, the primary winding of transformer can no longer sustain any current flow. The abrupt termination of current flow in this primary winding induces a current in the secondary winding connected to the base of transistor 280. Transistor 280 is therefore turned ON and the transfer is effected.

It can be seen that any disparities between switching times of the various transistors have been circumvented. None of these transistors can be switched until the set-one pulse is applied, i.e., switch 311 is opened. Switch 311 is returned to a negative voltage supply at a slightly lower level than the voltage supply to which diode 272 is connected. Diode 274 is therefore normally forward-biased and will therefore sustain the current flow in the primary winding of transformer 275 until switch 311 is opened. Switch 311 remains open only long enough for the primary current to stabilize in the OFF condition.

It will be apparent that a sequence of set-zero pulses immediately followed by set-one pulses will serve to shift any sequence of states through the shift register of FIG. 3, including a sequence of adjacent ON states. No difficulties arise from the differences in switching times of the transistors because they are all constrained to await switching until a set-one pulse arrives. The set-one pulse actively prevents current flow in the primary of the coupling transformers and hence prevents the loss of the switching pulse.

If it is desired to clear the register of its contents, i.e., reset all of the stages to the OFF state, it is merely necessary to apply a set-zero pulse which is not immediately followed by a set-one pulse. The transients in the coupling transformers will decay through the set-one switch 311 and will not be transferred to the secondary windings of the transformer.

It will be noted that serial input terminal 309 is connected through the primary winding of transformer 265 and diode 303 to the set-one bus 302. Each set-one pulse applied during the shifting operation will therefore also interrupt any current flow which might exist in this winding. This current will therefore be transferred to the base of transistor 270 to turn it ON. In this way, successive current conditions at terminal 309, i.e., current flow or no current flow, will be shifted into the first stage of the shift register on successive advancing operations, represented by successive set-one pulses.

The output terminal 308 receives the successive states of transistor 290 in the last stage of the shift register in the form of current pulses transferred from the primary winding of transformer 295 on successive set-one pulses. These current pulses may be utilized in any desired manner by data handling apparatus connected to terminal 308.

For the most useful shift register applications, means should be provided for parallel as well as serial read-in and read-out. Thus, it should be possible to read binary representations at terminals 306, 316, . . . 326 into the register stages and to read out the states of the various stages of the register in parallel to output terminals 307, 317, . . . 327. These parallel read-in and read-out arrangements will now be described.

Binary signal conditions at terminals 306 through 326 are represented by the presence or absence of current flow from binary storage devices connected thereto but not shown. In order to read these signals into the shift register of FIG. 3, read-in switch 312 is closed for a brief period of time and then reopened. The closing of switch 312 establishes a current path from terminal 306, for example, through a second input winding in transformer 265, through diode 273 to read-in bus 304 and through switch 312 to the negative voltage supply. Upon the re-opening of switch 312, this current flow is abruptly terminated and a current is induced in the secondary winding of transformer 265 to turn transistor 270 ON. If there is no current flow from terminal 306, representing the opposite binary condition, no current will be transferred. To insure that the OFF state will be read in as well as the ON state, the read-in pulse is preceded by a set-zero pulse. Set-one switch 311 is opened during the entire read-in operation to prevent the associated windings from unduly loading the read-in windings and to prevent the previous state of the preceding stage from affecting the conditions read in from the parallel read-in terminals.

It is apparent that read-in may take place from any set of read-in terminals among a plurality of alternate sets. This may be accomplished, for example, by providing separate read-in windings on transformers 265, 275 and 285, one for each alternate input. Alternatively, conventional gates could be used to connect the desired one of a plurality of binary sources to terminal 306. In either case, the means for providing such multiple inputs would be readily apparent to those skilled in the art and should not be construed as departing from the spirit or scope of this invention.

Parallel read-out to terminals 307, 317, . . . 327 is accomplished in a somewhat similar manner. These terminals are connected through second output windings on transformers 275, 285, . . . 295 and diodes 279, 289, . . . 299, respectively, to read-out bus 305. Bus 305 is connected through normally open switch 313 to a positive voltage supply. To accomplish read-out, switch 313 is first closed. The positive voltage supply connected thereto reverse-biases the associated diode, diode 279, for example. Following the closing of switch 313, set-one switch 311 is momentarily opened. This opening of switch 311 interrupts the current flow, if any, in the primary winding and thereby induces a current pulse in the read-out winding which is transferred to the read-out terminal. To keep this read-out from affecting the next stage, auxiliary read-out switch 314 is opened synchronously with set-one switch 311. When switch 314 is opened, no current return is provided for the secondary windings of the coupling transformer and hence no current is induced in these windings. This has the added advantage of reducing the load on the primary winding during read-out.

It will be noted that auxiliary read-out switch 314 is normally closed to permit the shifting and read-in operation to proceed as described above. It is only during read-out that this switch is opened to prevent the normal transfer between stages. Similarly, switches 312 and 313 are normally open to prevent their associated windings from unduly loadings the transfer windings during the shifting operation.

The read-out sequence described above may or may not overlap a set-zero pulse. If no set-zero pulse occurs prior to the opening of set-one switch 311 in a read-out operation, the read-out is non-destructive and the various stages of the register continue to store the same states. If, on the other hand, a set-zero pulse does precede the opening of the set-one switch 311, as occurs in normal shifting operations, the states of the various stages are not only read out, but the states of these stages are simultaneously destroyed so that after the read-out all stages will be in the OFF state.

Switches 311, 312, 313 and 314 have been illustrated graphically as mechanical switches. At the speeds desired, it is clear that some form of electronic switch would be necessary. Junction transistors, for example, have well-known switching properties by which signals on the base electrode establish, alternatively, a very high or a very low impedance path between the emitter and collector electrodes. Switches 311 through 314 could, therefore, very well comprise junction transistors operated by appropriate switching pulses applied to their base electrodes.

A program generator 315 is illustrated as the source of the various control signals for the shift register of FIG. 3. Following the principles outlined above, the specific construction of a program generator suitable for carrying out any desired sequence may readily be achieved. A typical program, for example, may call for shifting in binary bits in series until the register is full, reading out the entire contents of the register in parallel, reading in a different sequence in parallel, and shifting out the new bits in series. Many other more useful programs will be readily apparent to those skilled in the art.

While suitable component values for the disclosed circuits may be readily arrived at by those skilled in the art, the following circuit parameters for stage 1 of the ring counter of FIG. 2 are given as typical:

| | |
|---|---|
| Resistor 79 | 825 ohms. |
| Resistor 78 | 825 ohms. |
| Resistor 170 | 2200 ohms. |
| Voltage supply 111 | +3.0 volts. |
| Voltage supply 112 | +1.5 volts. |
| Voltage supply 114 | −0.5 volt. |
| Voltage supply 117 | −12.0 volts. |
| Diodes 76*a* and 77 | G.E. Type 1N118. |
| Transistor 72 | G.E. Type 2N110. |

Each of the various transformers used in the circuit may comprise any pulse transformer having the desired memory characteristics. For example, a 75 millihenry winding would provide a suitable 15 microsecond memory. The turns ratio between the primary and secondary windings may be chosen to obtain the desired current output pulse. A ratio of 1.5 to 1.0 has been found to be satisfactory in most applications.

It is to be understood that the above-described arrangements are merely illustrative of the numerous and varied other arrangements which could represent applications of the principles of the invention. These other arrangements can readily be devised by those skilled in the art without departing from the spirit or scope of the invention.

What is claimed is:

1. In a shift register, including first and second bistable trigger circuits, noncapacitive pulse transfer means comprising a transformer having a primary winding and a secondary winding, said primary winding being connected to the output of said first bistable trigger circuit and said secondary winding being connected through unidirectional conducting means to the input of said second bistable trigger circuit, switching means for applying cutoff pulses to said first and second bistable trigger circuits, means connected to said primary winding to sustain current flow therethrough when said first bistable trigger circuit is cut off by said cut-off pulses, and means for disabling said current sustaining means following each of said cut-off pulses and before current ceases to flow in said primary winding.

2. The combination according to claim 1 wherein said transformer includes a further winding, means for establishing a current path in said third winding, and means for thereafter operating said disabling means.

3. The combination according to claim 1 wherein said transformer includes a further winding, means for establishing a current path in said fourth winding, and means for interrupting said current path in said fourth winding.

4. An electrical counter circuit comprising in combination a plurality of bistable elements capable of remaining in either one of two stable current-conduction states, noncapacitive coupling means interconnecting each of said bistable elements with a succeeding one of said bistable elements to form a closed ring, said coupling means each comprising a transformer having a primary winding and a secondary winding, means connecting each of said primary windings to the output of the preceding one of said bistable elements, asymmetrical current conduction means connecting each of said secondary windings to the input of the succeeding one of said bistable elements, a source of intermittent current pulses, and means for applying said current pulses to all of said bistable elements to simultaneously switch them to one of said current-conduction states.

5. The electrical counter circuit according to claim 4 wherein said bistable elements each comprise a single transistor having collector emitter and base electrodes and wherein said output is derived from said collector electrode and said input is derived from said base electrodes.

6. The electrical counter circuit according to claim 5 wherein said pulse applying means comprises an asymmetrical current conducting device connected to said base electrode of each of said transistor bistable elements.

7. An electrical shift register circuit comprising in combination a plurality of bistable elements capable of remaining in either a high or a low stable current-conduction state, noncapacitive coupling means interconnecting each of said bistable elements with a succeeding one of said bistable elements to form a chain, said coupling means each comprising a transformer having at least a first and a second winding, normally enabled current-conducting means connecting each of said first windings to the output of the preceding one of said bistable elements, asymmetrical current-conduction means connecting each of said second windings to the input of the succeeding one of said bistable elements, a source of intermittent current pulses, means for applying said current pulses to all of said bistable elements to simultaneously switch them to said low current-conduction state, means for sustaining current flow in said first windings when said bistable elements are switched to said low current-conduction state, and means for disabling said normally enabled current-conduction means following each of said current pulses.

8. The electrical shift register circuit according to claim 7 wherein said transformers each include a further winding, first normally disabled current-conduction means interconnecting each of said further windings with a separate source of binary representing current pulses, means for enabling said first normally disabled current-conduction means, and means for thereafter again disabling said first normally disabled current-conduction means.

9. The electrical shift register circuit according to claim 7 wherein said transformers each include a further winding, second normally disabled current-conduction means interconnecting each of said further winding with a separate utilization device for binary representing current pulses, means for enabling said second normally disabled current-conduction means, and means for thereafter disabling said normally enabled current-conduction means interconnecting each of said first windings and said outputs.

10. A sequential pulse transfer circuit comprising a plurality of current responsive bistable stages connected in cascade, each of said stages comprising a single transistor having emitter, collector and base electrodes, impedance means connected to each of said base electrodes to provide a negative resistance characteristic between said emitter and collector electrodes whereby each of said transistors is adapted to assume either one of two stable current conduction states, and noncapacitive interstage coupling means connecting successive ones of said stages, each of said coupling means comprising a current transformer having at least one primary and one secondary winding, means interconnecting said primary winding and the collector electrode of the preceding one of said transistors, unilaterally conducting means interconnecting said secondary winding and the base electrode of the succeeding one of said transistors, means for temporarily resetting all of said transistors to the low current conduction state, and means including said unilaterally conducting means and said resetting means for sustaining current flow in said secondary winding while said succeeding transistor is in said low current conduction state.

References Cited in the file of this patent

UNITED STATES PATENTS

| | | |
|---|---|---|
| 2,594,336 | Mohr | Apr. 29, 1952 |
| 2,782,344 | Sharin | Feb. 19, 1957 |
| 2,820,153 | Woll | Jan. 14, 1958 |
| 2,848,628 | Altschul | Aug. 19, 1958 |
| 2,873,385 | Ostendorf | Feb. 10, 1959 |
| 2,910,596 | Carlson | Oct. 27, 1959 |

OTHER REFERENCES

"Transistor Circuits and Applications," by Carrol, article therein by Deuitch, page 248, published by McGraw-Hill, N.Y., 1957.